(12) United States Patent
Schroeder

(10) Patent No.: US 10,076,110 B2
(45) Date of Patent: Sep. 18, 2018

(54) DOG REPELLENT SYSTEM FOR CYCLISTS

(71) Applicant: Richard Schroeder, Temple, TX (US)

(72) Inventor: Richard Schroeder, Temple, TX (US)

(73) Assignee: Richard Schroeder, Temple, TX (US)

( * ) Notice: Subject to any disclaimer, the term of this patent is extended or adjusted under 35 U.S.C. 154(b) by 0 days.

(21) Appl. No.: 14/499,431

(22) Filed: Sep. 29, 2014

(65) Prior Publication Data

US 2016/0088829 A1 Mar. 31, 2016

(51) Int. Cl.

| | |
|---|---|
| *A01G 25/09* | (2006.01) |
| *A01M 29/12* | (2011.01) |
| *B65D 83/16* | (2006.01) |
| *B62J 23/00* | (2006.01) |
| *A01M 29/18* | (2011.01) |
| *B05B 12/00* | (2018.01) |
| *B05B 9/04* | (2006.01) |
| *A01M 29/00* | (2011.01) |
| *B05B 15/00* | (2018.01) |
| *B05B 9/00* | (2006.01) |
| *B65D 83/14* | (2006.01) |

(52) U.S. Cl.
CPC ............ *A01M 29/12* (2013.01); *A01M 29/00* (2013.01); *A01M 29/18* (2013.01); *B05B 9/007* (2013.01); *B05B 9/0403* (2013.01); *B05B 12/002* (2013.01); *B05B 15/00* (2013.01); *B62J 23/00* (2013.01); *B65D 83/16* (2013.01); *B65D 83/752* (2013.01)

(58) Field of Classification Search
CPC ...... A01M 29/12; A01M 29/18; A01M 29/00; B62J 23/00; B65D 83/16; B65D 83/20; B05B 15/00; B05B 9/007; B05B 9/0403; B05B 12/002
USPC ............... 239/146, 289, 337, 373, 578, 172; 180/271; 367/139
See application file for complete search history.

(56) References Cited

U.S. PATENT DOCUMENTS

| | | | | | |
|---|---|---|---|---|---|
| 627,693 | A | * | 6/1899 | Howarth | ............. B05B 11/0005 239/289 |
| 5,318,147 | A | * | 6/1994 | Maiefski | ................. B60R 21/12 180/271 |
| 5,842,644 | A | * | 12/1998 | Remis | ..................... B60R 21/12 239/289 |
| 6,134,184 | A | * | 10/2000 | Waletzky | ............... A01M 29/16 367/139 |
| 9,326,491 | B1 | * | 5/2016 | Hegarty | ................. A01K 29/00 |
| 9,395,161 | B1 | * | 7/2016 | Hegarty | .................... F41H 9/10 |
| 2012/0193446 | A1 | * | 8/2012 | Scolari | ..................... B62J 99/00 239/172 |
| 2015/0084751 | A1 | * | 3/2015 | Crawford | ............. B60H 3/0071 340/384.2 |

\* cited by examiner

*Primary Examiner* — Steven J Ganey
(74) *Attorney, Agent, or Firm* — David G. Henry, Sr.

(57) ABSTRACT

A dog repellent system for including in the original construction of, or to be added to an existing vehicle that lacks a protective barrier for operators and passengers, such as bicycles, motorcycles, and the like.

6 Claims, 1 Drawing Sheet

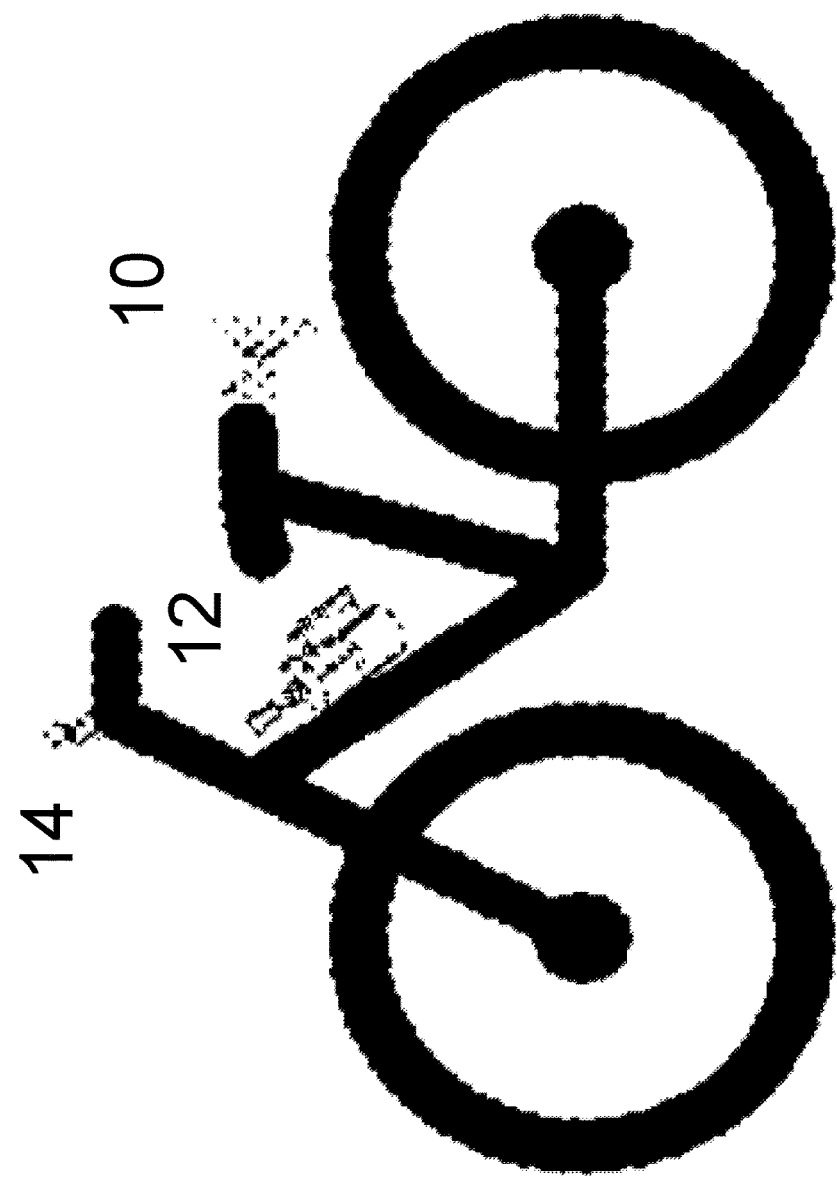

DOG REPELLENT SYSTEM FOR CYCLISTS

BACKGROUND OF THE INVENTION

1. Field of the Invention

The present invention relates to accessories for bicycles, motorcycles, and other conveyances lacking an outer, protective barrier.

2. Background Information

Each day, approximately 1000 Americans must seek emergency treatment for dog bites (Emergency Department Visits and Inpatient Stays Involving Dog Bites, 2008, by Laurel Holmquist, M.A. and Anne Elixhauser, Ph.D., Agency for Healthcare Research and Quality, Rockville, Md., November 2010). Accounting, in no small measure, to these bites, as well as other forms of injuries relating to dog attacks or those which occur in the context of cyclists (and operators of other vehicles devoid of external protection) when attacked by dogs. This problem is of such a magnitude that a number of websites and portions thereof (including those of the respected ASPCA) are devoted to this very topic. See, for example:

http://www.aspca.org/pet-care/virtualpet-behaviorist/
dog-behavior/dogs-chasing-bicycles-skateboards-and-other-moving;
http://www.clickertraining.com/node/3539; and
http://www.phred.org/~alex/kenkifer/www.kenkifer.com/
bikepages/traffic/dogs.htm.

Injuries arising from attacks by dogs upon cyclists are not limited to bites and scratches. In many cases, crashes that produce their own injuries are the result of a cyclist trying to outpace or otherwise avoid a pursuing dog or pack of dogs.

It might be reasonably said that there are as many opinions on minimizing dog attacks upon cyclists as there are opinion givers. Opinions include simply stopping, throwing things at dogs, trying to out pace dogs, and spraying some kind of repellent. At present, none of these options are realistic, at least in many cases. Stopping may remove the allure for some dogs, but in other cases may simply make an attack easier for the dogs. Throwing things at dogs may aggravate otherwise playful dogs, and actually increase the risk of attack if cyclist and dog come into direct contact. Outpacing a pursuing dog or pack of dogs is often not possible, and may involve loss of control by the cyclist. Finally, accessing and then operating a can or bottle of some form of repellent carries its own risks, including loss of control while attempting to outpace a pursuer.

Somehow repelling a dog, without a need for reckless driving, throwing objects while driving, or stopping in hopes that a dog is only chasing out of playfulness would clearly be an optimal choice. Therefore, use of a repellent, but in a manner that is practicable and effective, and not disruptive of normal cycling behavior, would represent the most desirable option for avoiding injury relating to dog pursuits and attacks.

In view of the foregoing, it would well serve the interests of cyclists (and operators of other vehicles not providing an outer, protective shell), as well as many others to provide a means by which dog repellent may be safely and effectively used by cyclists to avoid pursuit by dogs and associated attacks. Others benefited would include dog owners who may avoid legal liability otherwise arising from dog-induced injuries, loved ones of those whose injuries are thereby prevented, and society in general who otherwise collectively bear the costs associated with burdens on insurance and healthcare systems arising from such injuries.

SUMMARY OF THE INVENTION

In addressing the needs that are evident from the above discussion, the present invention provides a system for propelling pursuing dogs, which system may be added to existing vehicles (bicycles, motorcycles, etc.), or maybe included in the original configuration by manufacturers.

The dog repellent system of the present invention includes one or more spray nozzles, a repellent reservoir, and a rider-actuated trigger mechanism for releasing the repellent as needed.

BRIEF DESCRIPTION OF THE DRAWINGS

FIG. 1 is a depiction of a bicycle and a general representation of the placement of components of the present system in relation to such bicycle (or comparable vehicle).

DETAILED DESCRIPTION OF THE PREFERRED EMBODIMENT

Referring to FIG. 1, the essential components of the present dog repellent system include a spray mechanism 10, a repellant reservoir 12, and an actuator 14. The spray mechanism 10 may be as simple as the nozzle of an aerosol can, the aerosol can serving as repellant reservoir 12. Alternatively, spray mechanism 10 may be a nozzle manifold like component with a separate repellent reservoir 12 (somewhat analogous to a windshield washing system of a modern automobile).

The particular nature of actuator 14 depends, of course, on the nature of spray mechanism 10 and repellent reservoir 12 that are chosen. For example, if an electric pump is involved in propelling repellent through spring mechanism 10, an electrical button switch may serve as actuator 14, while a non-electric, hand-operated pneumatic system would involve something like a "squeeze bulb" that would be accessible near the cycles handlebars.

One example of an aerosol can-based system is depicted in U.S. Pat. No. 5,709,321, issued to Smrt, which patent is hereby incorporated by reference.

Whatever components are used, spring mechanism 10 will be configured and oriented for spraying repellent rearward of the cycle, and actuator 14 will be readily accessible by a rider, preferably through positioning adjacent to handlebar grips. Of course, particularly in the case of "factory equipment" incorporation by original manufacturers, tubes, wires, and the like may be routed through frame 1. Otherwise, these may be attached to frame components with everything from twist ties to ratchet strips. In any event, any aftermarket application should include caution with respect to tubes or wires interfering with safe operation of the cycle.

Suitable repellents are exemplified by the HALT brand dog repellent sold by ARI of Orchard Hill, Ga., but others are readily found and suitable for use in the context of the present invention.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A system for attachment to a passenger-exposed vehicle for repelling animals comprising:

spray mechanism attached to a vehicle and oriented to propel aerosol mist directly rearward of said vehicle;

repellant reservoir to maintain for maintaining a measure of animal repellent;

fluid propulsion device in fluid communication with said repellant reservoir and said spray mechanism to propel fluid within said repellant reservoir to said spray mechanism and causing said aerosol mist to be propelled directly rearward of said vehicle;

spray actuation device, a user control component of which is mounted near an operator guidance apparatus of said vehicle, said spray actuation device being operatively connected with said fluid propulsion device to selectively actuate said fluid propulsion device.

2. The system of claim 1 wherein said repellant reservoir is an aerosol can, said spray mechanism is a nozzle engaged with said aerosol can, and said spray actuation device is configured as remote actuation device to remotely actuate said nozzle of said aerosol can.

3. The system of claim 2 wherein said vehicle is selected from a group consisting of: bicycles, motorcycles, peddled tricycles, motorized tricycles, velocipedes, scooters, mopeds, and four wheelers.

4. A rider-exposed vehicle comprising:
two or more wheels;
a vehicle frame to which said wheels are rotationally attached;
propulsion device mechanically engaged with said wheels to impart rotational force to at least one of said wheels to propel said vehicle;
spray mechanism attached to said vehicle and oriented to propel aerosol mist directly rearward of said vehicle;
repellant reservoir to maintain a measure of animal repellent and attached to said vehicle frame;
fluid propulsion device in fluid communication with said repellant reservoir and said spray mechanism to propel fluid within said repellant reservoir to said spray mechanism and causing said aerosol mist to be propelled directly rearward of said vehicle; and
spray actuation device, a user control component of which is mounted near an operator control apparatus of said vehicle, said spray actuation device being operatively connected with said fluid propulsion device to selectively actuate said fluid propulsion device.

5. The rider-exposed vehicle of claim 4 wherein said repellant reservoir is an aerosol can, said spray mechanism is a nozzle engaged with said aerosol can, and said spray actuation device is configured as remote actuation device to remotely actuate said nozzle of said aerosol can.

6. The rider-exposed vehicle of claim 4 wherein said vehicle is selected from a group consisting of: bicycles, motorcycles, peddled tricycles, motorized tricycles, velocipedes, scooters, mopeds, and four wheelers.

* * * * *